(12) United States Patent
Ding (10) Patent No.: US 11,866,667 B2
(45) Date of Patent: Jan. 9, 2024

(54) MEMBRANE PROCESS FOR NATURAL GAS LIQUIDS RECOVERY AND HYDROCARBON DEW POINT CONTROL

(71) Applicant: AIR LIQUIDE ADVANCED TECHNOLOGIES U.S. LLC, Houston, TX (US)

(72) Inventor: Yong Ding, Waban, MA (US)

(73) Assignee: Liquide Advanced Technologies U.S. LLC, Houston, TX (US)

( * ) Notice: Subject to any disclaimer, the term of this patent is extended or adjusted under 35 U.S.C. 154(b) by 55 days.

(21) Appl. No.: 17/508,782

(22) Filed: Oct. 22, 2021

(65) Prior Publication Data

US 2023/0135721 A1     May 4, 2023

(51) Int. Cl.

| | |
|---|---|
| *C10L 3/10* | (2006.01) |
| *B01D 53/22* | (2006.01) |
| *B01D 69/12* | (2006.01) |
| *B01D 71/06* | (2006.01) |
| *F25J 1/00* | (2006.01) |

(52) U.S. Cl.
CPC ............ *C10L 3/101* (2013.01); *B01D 53/228* (2013.01); *B01D 53/229* (2013.01); *B01D 69/12* (2013.01); *B01D 71/06* (2013.01); *F25J 1/0022* (2013.01); *B01D 2053/221* (2013.01); *B01D 2256/245* (2013.01); *B01D 2257/504* (2013.01); *B01D 2311/04* (2013.01); *B01D 2325/20* (2013.01)

(58) Field of Classification Search
None
See application file for complete search history.

(56) References Cited

U.S. PATENT DOCUMENTS

| | | | |
|---|---|---|---|
| 5,089,033 A | 2/1992 | Wijmans | |
| 5,199,962 A | 4/1993 | Wijmans | |
| 5,256,295 A | 10/1993 | Baker et al. | |
| 5,332,424 A * | 7/1994 | Rao | B01D 53/229 95/143 |
| 5,698,011 A | 12/1997 | Chung et al. | |

(Continued)

*Primary Examiner* — Jason M Greene
(74) *Attorney, Agent, or Firm* — Allen E. White; Christopher J. Cronin (57) ABSTRACT

An energy efficient process for NGL recovery and production of compressed natural gas (CNG) in which natural gas is fed to a first gas separation membrane-based separation stage where it is separated into a permeate and a retentate. The high $C_{3+}$ concentration first stage permeate is chilled and separated to provide liquid phase NGL and a gaseous phase. The first stage retentate is separated at a second gas membrane-based separation stage to produce a retentate meeting pipeline specifications for CNG (including hydrocarbon dewpoint) and a permeate that is recycled to the first stage. The gaseous phase, constituting a low BTU fuel, may be used in on-site power generation equipment and/or in internal combustion engines. The second stage permeate (and optionally the third stage retentate) is (are) recycled back to the first stage to enhance the production of NGL and CNG. The gaseous phase may instead be fed to a third stage to produce a third permeate and a third residue, in which case the third permeate is recycled to the first stage and the third retentate is a low BTU fuel which may be used in on-site power generation equipment and/or in internal combustion engines.

11 Claims, 6 Drawing Sheets

(56) References Cited

U.S. PATENT DOCUMENTS

| | | |
|---|---|---|
| 5,755,855 A | 5/1998 | Baker et al. |
| 5,762,685 A | 6/1998 | Baker et al. |
| 5,769,926 A | 6/1998 | Lokhandwala et al. |
| 5,772,733 A | 6/1998 | Lokhandwala et al. |
| 5,772,734 A | 6/1998 | Baker et al. |
| 5,776,990 A | 7/1998 | Hedrick et al. |
| 5,964,923 A | 10/1999 | Lokhandwala |
| 6,053,965 A * | 4/2000 | Lokhandwala ...... B01D 53/229 95/52 |
| 6,161,386 A | 12/2000 | Lokhandwala |
| 6,428,606 B1 | 8/2002 | Gottschlich et al. |
| 6,648,944 B1 | 11/2003 | Baker et al. |
| 6,860,920 B2 | 3/2005 | Simmons |
| 7,537,641 B2 | 5/2009 | Lokhandwala et al. |
| 7,604,681 B2 | 10/2009 | Malsam et al. |
| 7,799,964 B2 | 9/2010 | Minhas et al. |
| 8,575,414 B2 | 11/2013 | Liu et al. |
| 8,828,121 B1 | 9/2014 | He et al. |
| 8,906,143 B2 | 12/2014 | Lokhandwala |
| 9,017,451 B2 | 4/2015 | Wynn et al. |
| 9,221,730 B2 | 12/2015 | Lokhandwala et al. |
| 2015/0059577 A1 | 3/2015 | Lokhandwala |
| 2015/0217224 A1 | 8/2015 | Lien |

\* cited by examiner

Table 1: Material balance for example 1.

| Property or Component | natural gas (mol%) | compressed natural gas (mol%) | Flow 1st retentate (mol%) | 1st permeate (mol%) | NGL (mol%) |
|---|---|---|---|---|---|
| Pressure (psia) | 50 | 900 | 895 | 200 | 200 |
| Flow Rate (MMSCFD) | 2.0 | 2.0 | 0.50 | 1.50 | 0.027 |
| $CO_2$ | 0.59 | 0.59 | 0.22 | 0.72 | 0.21 |
| Nitrogen | 0.43 | 0.43 | 0.98 | 0.25 | 0.01 |
| Methane | 79.60 | 79.60 | 90.26 | 76.05 | 7.80 |
| Ethane | 12.03 | 12.03 | 6.05 | 14.02 | 10.50 |
| Propane | 4.32 | 4.32 | 1.62 | 5.22 | 16.27 |
| i-Butane | 0.48 | 0.48 | 0.16 | 0.59 | 4.75 |
| n-Butane | 1.55 | 1.55 | 0.50 | 1.90 | 21.55 |
| i-Pentae | 0.34 | 0.34 | 0.07 | 0.43 | 10.15 |
| n-Pentane | 0.42 | 0.42 | 0.09 | 0.53 | 15.25 |
| Hexanes | 0.23 | 0.23 | 0.04 | 0.29 | 13.51 |

FIG 5

Table 2. Material balance for example 2.

| Property or Component | Flow natural gas (mol%) | compressed and combined natural gas and second permeate (mol%) | 1st retentate (mol%) | 1st permeate (mol%) | NGL (mol%) | 2nd retentate (mol%) | 2nd permeate (mol%) |
|---|---|---|---|---|---|---|---|
| Pressure (psia) | 50 | 900 | 897 | 200 | 200 | 893 | 50 |
| Flow Rate (MMSCFD) | 2.0 | 2.93 | 2.03 | 0.89 | 0.054 | 1.11 | 0.93 |
| $CO_2$ | 0.59 | 0.65 | 0.49 | 1.03 | 0.25 | .24 | .79 |
| Nitrogen | 0.43 | 0.35 | 0.44 | 0.14 | 0.00 | .67 | .17 |
| Methane | 79.60 | 77.35 | 82.07 | 66.59 | 6.49 | 90.11 | 72.48 |
| Ethane | 12.03 | 13.42 | 11.09 | 18.70 | 11.65 | 6.65 | 16.40 |
| Propane | 4.32 | 4.87 | 3.64 | 7.68 | 17.94 | 1.60 | 6.07 |
| i-Butane | 0.48 | 0.51 | 0.36 | 0.85 | 4.69 | 0.13 | 0.63 |
| n-Butane | 1.55 | 1.78 | 1.26 | 2.96 | 22.19 | 0.46 | 2.20 |
| i-Pentate | 0.34 | 0.37 | 0.23 | 0.70 | 10.00 | 0.05 | 0.44 |
| n-Pentane | 0.42 | 0.46 | 0.28 | 0.87 | 14.55 | 0.06 | 0.54 |
| Hexanes | 0.23 | 0.25 | 0.14 | 0.49 | 12.22 | 0.02 | 0.28 |

FIG 6

MEMBRANE PROCESS FOR NATURAL GAS LIQUIDS RECOVERY AND HYDROCARBON DEW POINT CONTROL

FIELD OF THE INVENTION

The invention pertains to a method for dewpointing natural gas and recovering natural gas liquids (NGL) therefrom.

BACKGROUND OF THE INVENTION

Large volumes of natural gas generated during oil production (i.e., associated gas) are flared due to the lack of an efficient separation technology that can treat the gas at the well head. Based on the World Bank, as of the end of 2011, $150 \times 10^9$ cubic meters ($5.3 \times 10^{12}$ cubic feet) of associated gas were flared annually. This amount is equivalent to about 25 percent of the annual natural gas consumption in the United States or about 30 percent of the annual gas consumption in the European Union. If it were to reach market, this quantity of gas (at a nominal value of $5.62 per 1000 cubic feet) would be worth $29.8 billion USD. Also as of the end of 2011, 10 countries accounted for 72 percent of the flaring, and twenty for 86 percent. The top ten leading contributors to world gas flaring at the end of 2011, were (in declining order): Russia (27%), Nigeria (11%), Iran (8%), Iraq (7%), USA (5%), Algeria (4%), Kazakhstan (3%), Angola (3%), Saudi Arabia (3%) and Venezuela (3%). Therefore, practical and economical methods to capture and utilize the flaring gas will not only generate significant energy value, but also reduce gas emission to the environment.

Ideally, the flaring gas can be captured through NGL production and compressed natural gas production, while the reject gas is used as the fuel locally to power the equipment. Membrane processes have been proposed for this purpose. In the membrane process, clean gas is normally obtained at high pressure, while the $C_{2+}$ enriched gas is obtained at lower pressure. A membrane separation efficiency is normally controlled by the stage cut (i.e., the ratio between the permeate flow and the feed flow) if the separation factors are fixed. In order to obtain high pressure compressed gas meeting the pipeline specification, a high stage cut is normally required. On the other hand, in order to recover NGL efficiently from the permeate, it would require the permeate stream to contain $C_{3+}$ as high as possible. Unfortunately, the $C_{3+}$ concentration in the permeate decreases as the stage cut increases. Due to this contradictory effect, membrane processes have not yet found significant application for flare gas capture.

Therefore, there is a need for a method for recovering NGLs from natural gas that avoids the problems suffered by conventional membrane-based processes.

SUMMARY OF THE INVENTION

There is disclosed a process for dewpointing natural gas that provides for recovery of NGL. The process includes the following steps. A flow of associated gas, that does not meet a predetermined specification(s) for hydrocarbon dewpoint and/or a gross heating value, is fed to a first gas separation membrane-based separation stage comprising one or more gas separation membranes selective for $C_{2+}$ hydrocarbons over methane to produce a flow of a first permeate enriched in $C_{2+}$ hydrocarbons and a flow of a first retentate enriched in methane. The first permeate is chilled to provide a flow of chilled first permeate. The flow of chilled first permeate is separated to produce a flow of a first gaseous phase deficient in $C_{3+}$ hydrocarbons and a flow of a first liquid phase enriched in $C_{3+}$ hydrocarbons. The flow of the first liquid phase is recovered as NGL. The flow of a first retentate, that does not meet a predetermined specification for gross heating value, is fed to a second gas separation membrane-based separation comprising one or more gas separation membranes selective for $C_{2+}$ hydrocarbons over methane to produce a flow of a second permeate enriched in $C_{2+}$ hydrocarbons and a flow of a second retentate enriched in methane that meets the predetermined specification. The flow of a second retentate is recovered, the recovered second retentate meeting a predetermined specification(s). The flow of second permeate is compressed. The flow of compressed second permeate is fed along with the flow of associated gas to the first gas separation membrane-based separation stage.

The process may include one or more of the following aspects:
- the flow of second permeate and the flow of natural gas are combined and compressed prior to being fed to the first gas separation membrane-based separation stage, prior to being combined with the flow of second permeate and compressed, the flow of natural gas has a pressure of 1-15 bar.
- the flow of first gaseous phase is fed to a third gas separation membrane-based separation unit comprising one or more gas separation membranes selective for $CO_2$ over methane to produce a flow of a third permeate enriched in $CO_2$ and a third retentate enriched in methane; and the flow of compressed third retentate is fed along with the flow of second permeate and the flow of natural gas to the first gas separation membrane-based separation stage.
- each of the membranes of the first, second, and third gas separation membrane-based separation stages has a selective layer made of a same polymer, the polymer being a rubbery polymer or being a glassy polymer having a high free volume.
- the flow of the third permeate is recovered and used as a low-BTU fuel for powering on-site power generation equipment and/or in internal combustion engines.
- the flow of the first gaseous phase is recovered and used as a low-BTU fuel for powering on-site power generation equipment and/or in internal combustion engines.
- the flow of natural gas has not been compressed prior to being fed to the first gas separation membrane-based separation stage, the flow of natural gas having a pressure of 15-100 bar.
- the flow of first gaseous phase is fed to a third gas separation membrane-based separation unit comprising one or more gas separation membranes selective for $CO_2$ over methane to produce a flow of a third permeate enriched in $CO_2$ and a flow of a third retentate enriched in methane, wherein the flow of second permeate and the flow of third retentate are combined and compressed prior to being fed to the first gas separation membrane-based separation stage.
- each of the membranes of the first, second, and third gas separation membrane-based separation stages has a selective layer made of a same polymer, the polymer being a rubbery polymer or being a glassy polymer having a high free volume.
- the one or more membranes of the first and second gas separation membrane-based separation units have a selective layer comprising a rubbery polymer.

the one or more membranes of the first and second gas separation membrane-based separation units have a selective layer comprising a glassy polymer having a high free volume.

each of the membranes of the first and second gas separation membrane-based separation units have a selective layer made of a same polymer, the polymer being a rubbery polymer or being a glassy polymer having a high free volume.

each of the membranes of the first and second stages have a separation layer made of a copolymer or block polymer of the formula:

where PA is an aliphatic polyamide having 6 or 12 carbon atoms and PE is either poly(ethylene oxide) poly(tetramethylene oxide).

each of the membranes of the first, second, and third stages have a separation layer made of repeating units of the following monomers:

DETAILED DESCRIPTION OF THE INVENTION

The invention provides energy efficient processes for NGL recovery and production of compressed natural gas (CNG). The associated gas to be treated by the invention does not that does not meet a predetermined pipeline natural gas specification for hydrocarbon dewpoint and/or a gross heating value. While these specifications vary from region to region and may be expressed in different units, hydrocarbon dewpoint is expressed as a temperature at a standard pressure while gross heating value is expressed as a unit of combustion energy per unit volume at standard temperature. The essence of the invention is to break the conventional single gas separation membrane-based separation stage into either a two stage or a three stage process, each containing one or more membranes, in order to maximize the NGL and CNG production with minimum energy consumption. In the first stage, the membrane(s) is (are) designed to obtain a permeate stream with high $C_{3+}$ concentration, which is further chilled to obtain a liquid phase of NGL and a low BTU value gaseous phase which can either be used in on-site power generation equipment and/or in internal combustion engines or be treated in a third stage to provide a low BTU value permeate stream for use in on-site power generation equipment and/or in internal combustion engines and a third retentate which is recycled back to the first stage to boost recovery of CNG. In the second stage, the membrane is optimized to produce a retentate meeting the predetermined specification and a $C_{3+}$ hydrocarbon-enriched permeate. The permeate of the second stage is recycled back to the first stage to enhance the production of NGL and CNG.

The one or more membranes used in the process have a separation layer made of a polymeric material that should preferentially permeate $C_{3+}$ hydrocarbons over methane. Such membranes can be rubbery membranes, specific examples of which include but are not limited to polydimethylsiloxane, polymethyloctylsiloxane, including commercially available rubbery materials such PEBAX based membranes.

Other such membranes can be glassy polymer membranes with a high free volume (i.e., at least 0.34). Glassy polymers with a free volume exhibit reversed membrane selectivity by permeating $C_{3+}$ faster than methane. Non-limiting examples of such reverse selective glassy polymers including poly trimethylsilyl propyne (PTMSP) and so called polymers with intrinsic porosities (PIM).

In addition to the foregoing materials, other suitable polymeric materials for use in the separation layer of the membranes of the first, second, and third stages may be made of a copolymer or block polymer of tetramethylene oxide, and/or propylene oxide, or ethylene oxide. Due to the modest methane productivity of these polymers in comparison with silicone based polymers, membranes with low methane productivity for methane can be conveniently achieved.

Copolymers or block polymers of tetramethylene oxide, and/or propylene oxide, or ethylene oxide may be conveniently synthesized, such as the polyester ether disclosed in U.S. Pat. No. 6,860,920, the polyester ethers of which are incorporated by reference.

where PE may be one or more of the following structures:

Other copolymers or block polymers of tetramethylene oxide, and/or propylene oxide, or ethylene oxide may be conveniently synthesized, such as polyimide ether disclosed in U.S. Pat. No. 5,776,990, the polyimide ethers of which are incorporated by reference.

The copolymers can be further obtained by copolymerization of acrylated monomers containing oligomeric propylene oxide, ethyelene oxide, or tetramethyelene oxide. Commercially available copolymers include poly(ether-b-amide) multiblock copolymers available from Arkema under the trade name of PEBAX, and poly(butylene terephthalate) ethylene oxide copolymer available under the trade name of Polyactive.

Typically, the PEBAX polymers from Arkema include PEBAX 7233, PEBAX 7033, PEBAX 6333, PEBAX 2533, PEBAX 3533, PEBAX 1205, PEBAX 3000, PEBAX 1657, or PEBAX 1074. The PEBAX polymers have the following general chemical structure:

Where PA is an aliphatic polyamide "hard" block (nylon 6 [PA6] or nylon 12 [PA12], and PE denotes a polyether "soft" block, either poly(ethylene oxide) [PEO] or poly(tetramethylene oxide) [PTMEO].

Commercial available PolyActive multiblock copolymers have the following general chemical structure:

While the membrane of the first, second, and third stages may have any configuration known in the field of gas separation, typically they are formed as a flat film or as a plurality of hollow fibers. In one embodiment, the separation layer is supported by a support layer where the separation layer performs the desired separation while the support layer provides mechanical strength. In the context of hollow fibers, the separation layer is configured as a sheath surrounding a core made of the support layer. Regardless of the configuration of the membrane, the support layer may be any porous substrate known in the field of gas separation membranes and includes but is not limited to, polyimides, polysulfones, and polyether ether ketones. Typical hollow fiber membrane supports are PEEK porous substrate fibers commercially available from Air Liquide Advanced Separations, a unit of Air Liquide Advanced Technologies, US.

Typically, the gas separation membrane(s) of the first gas separation membrane stage 3 includes membranes commercially available from Air Liquide Advanced Separations under the trade name PEEK-SEP.

Each of the membranes in a given stage may be the same or different, but typically are the same. Each of the same membranes in a given stage may be the same as or different from the membranes in another or all other stages. Typically, each of the membranes in each of the stages has a same separation layer.

I will now describe particular embodiments.

Figure 1:
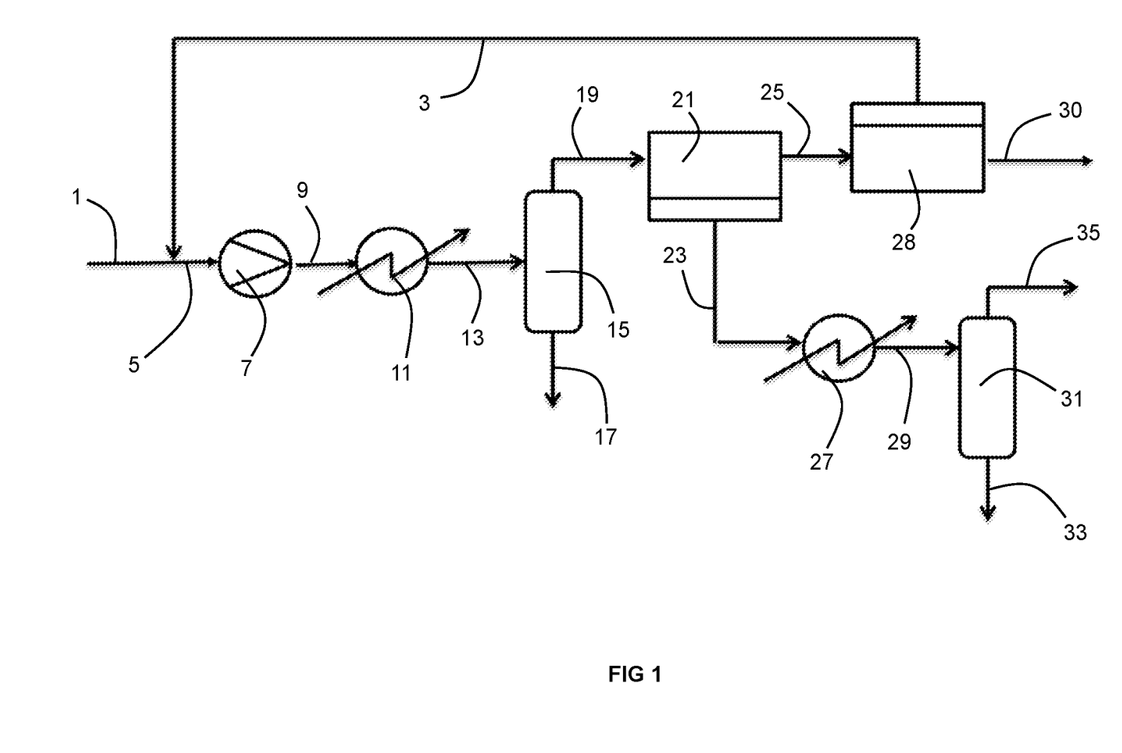
FIG. 1 is a schematic of an embodiment of the method and system of the invention.

As illustrated in FIG. 1, the associated gas (which does not meet predetermined specifications for pipeline natural gas) is at a relatively low pressure (i.e., 1-15 bar) and is subjected to a two stage membrane process. A flow of the associated gas 1 is combined with a recycled flow of the second permeate 3. The combined flow of the associated gas and second permeate 5 is first compressed with a compressor 7. The compressed flow 9 is cooled at a chiller or heat exchanger for partial condensation of condensable components therein. The biphasic cooled flow 13 is fed to a phase separator 15 for separation into a gaseous phase and a liquid phase. If sufficiently concentrated in $C_{3+}$ hydrocarbons, this liquid phase may be recovered as NGL, or further treated if necessary, to produce NGL. The compression, cooling, and separation functions of the compressor 7, the chiller or heat exchanger 11, and phase separator 15 may be combined into a single device or two devices as commonly known.

A flow of the gaseous phase 19 is fed to the first stage 21 which is optimized to produce a flow of a first permeate 23 with high content of $C_{3+}$ hydrocarbons. The first stage 21 also produces a flow of a first retentate 25. The flow of the first retentate 25 is fed to the second stage 28. The second stage 28 is optimized to obtain a flow of a second rententate 30, constituting compressed natural gas that meets the predetermined specification. The second stage 28 also produces the flow of the second permeate 3. In order to boost recovery of $C_{3+}$ hydrocarbons in the process, the flow of the second permeate 3 is recycled back to the compressor 7 where it is combined and compressed with the flow of associated gas 1. A flow of the first permeate 23 is chilled at a chiller or heat exchanger 27 (and/or optionally expanded at a Joule-Thomson valve) to provide a biphasic flow of gaseous phase and liquid phase 29. The biphasic flow 29 is separated, at a phase separator 31, into a flow of a gaseous phase 35 and a flow of a liquid phase 33. The partial condensation and phase separation functions of the chiller or heat exchanger (and/or optional JT valve) may be combined in a single device. The flow of liquid phase 33 constitutes the NGL liquid. The flow of gaseous phase 35 may be used in on-site power generation equipment and/or in internal combustion engines.

Figure 2:
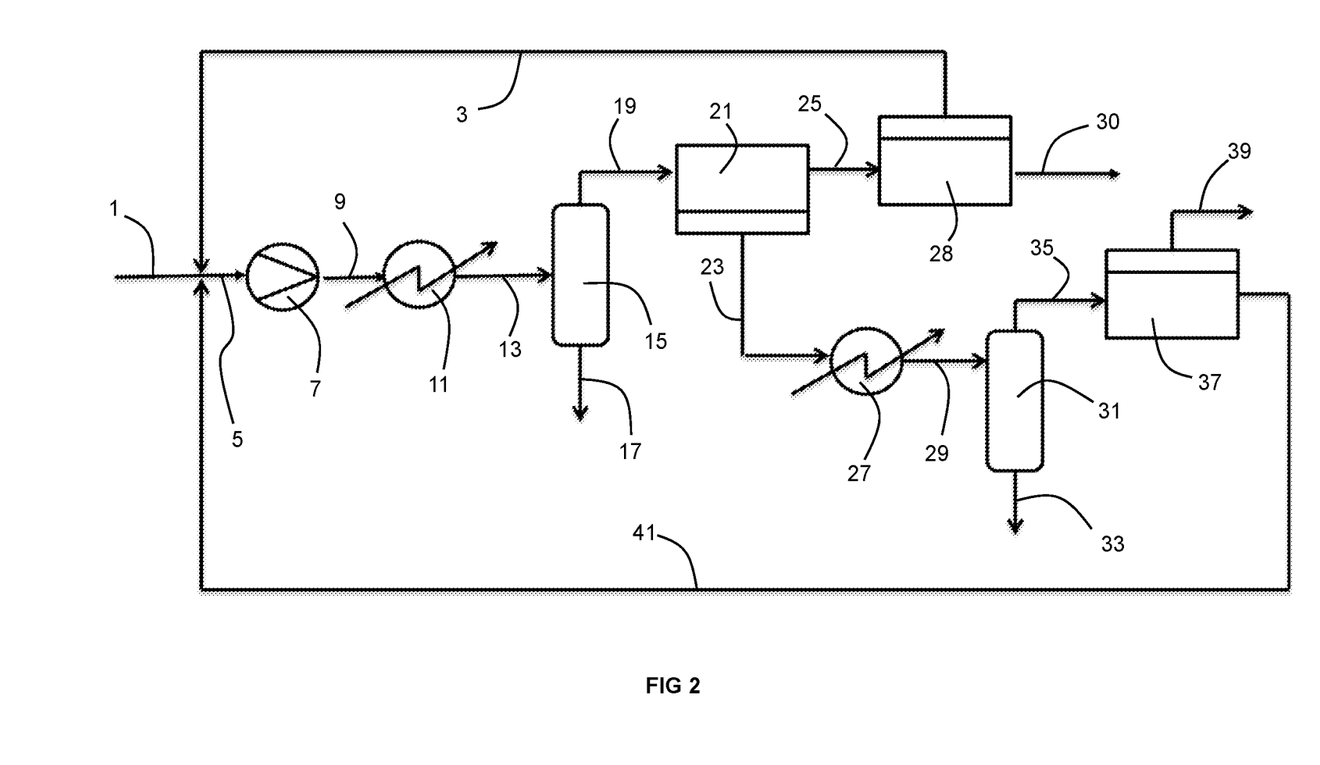
FIG. 2 is a schematic of an embodiment of the method and system of the invention.

The scheme shown in FIG. 2 is the same as the scheme illustrated in FIG. 1, except that instead of recovering a flow of the gaseous phase 35 as a low BTU value fuel in on-site power generation equipment or internal combustion engines, the gaseous phase 35 is fed to a third stage 37. The third stage 37 is optimized to produce a flow of a third permeate 39 with a high $C_{3+}$ hydrocarbon content which may be used in onsite power generation equipment and/or in internal combustion engines. In order to boost recovery of methane by the process, the third stage 37 is also optimized to produce a flow of a third retentate 37 which is recycled back to the compressor 7 where it is combined and compressed with the flow of associated gas 1 and the flow of second permeate 3.

Figure 3:
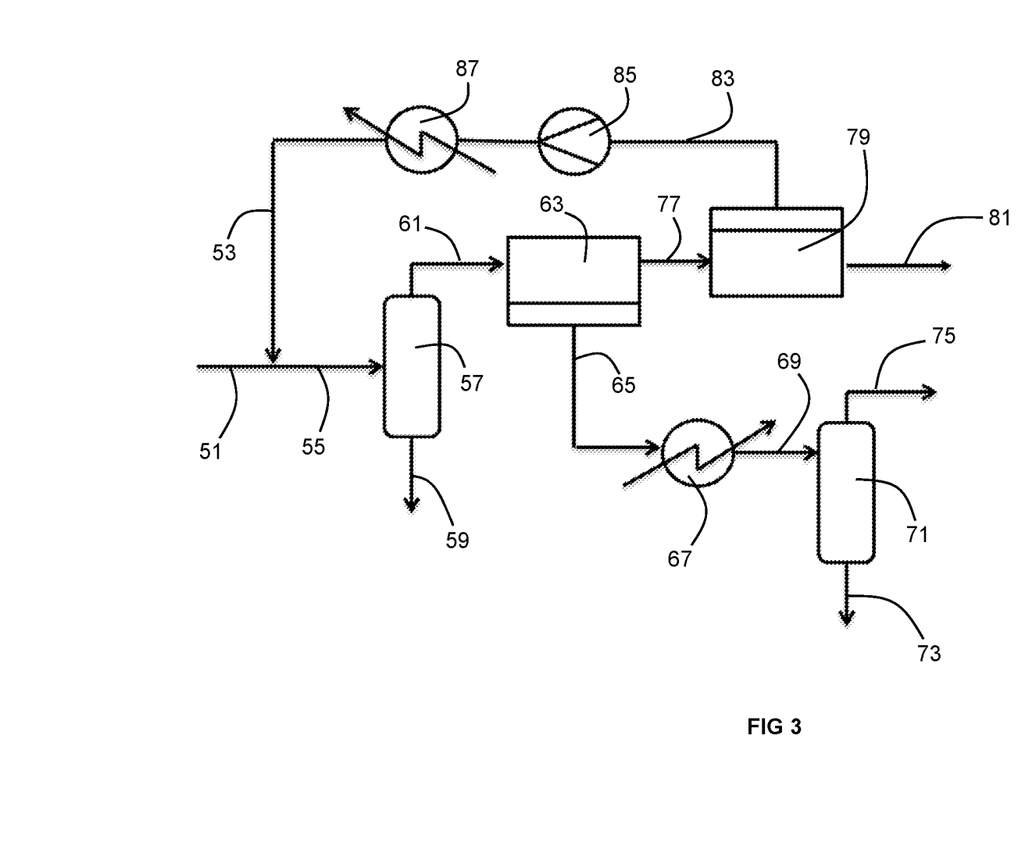
FIG. 3 is a schematic of an embodiment of the method and system of the invention.

As illustrated in FIG. 3, the associated gas (which does not meet predetermined specifications for pipeline natural gas) is at a relatively higher pressure (i.e., 15-100 bar) and, similar to the scheme illustrated in FIG. 1, is subjected to a two stage process. A flow of the associated gas 51 is combined with a recycled flow of compressed second permeate 53. The flow of associated gas 51 and/or the combined blow 55 may optionally be compressed. The combined flow 55 is cooled at a chiller or heat exchanger (not illustrated) for partial condensation of condensable components therein. The biphasic cooled flow is fed to a phase separator 57 for separation into a flow of a gaseous phase 61 and a flow of a liquid phase 59. If sufficiently concentrated in $C_{3+}$ hydrocarbons, this liquid phase may be recovered as NGL, or further treated if necessary, to produce NGL.

A flow of the gaseous phase 61 is fed to the first stage 63 which is optimized to produce a flow of a first permeate 65 with high content of $C_{3+}$ hydrocarbons. The first stage 63 also produces a flow of a first retentate 77. The flow of the first retentate 77 is fed to the second stage 79. The second stage 79 is optimized to produce a flow of a second rententate 81, constituting compressed natural gas that meets the predetermined specification. The second stage 79 also produces the flow of the second permeate 83. In order to boost recovery of $C_{3+}$ hydrocarbons in the process, the flow of the second permeate 83 is compressed at compressor 85 and cooled by a chiller or heat exchanger 87 before the flow of cooled, compressed second permeate 53 is combined with the flow of associated gas 51. The flow of the first permeate 65 is chilled at a chiller or heat exchanger 67 (and/or optionally expanded at a Joule-Thomson valve) to provide a biphasic flow of gaseous phase and liquid phase 69. The biphasic flow 69 is separated, at a phase separator 71, into a flow of a gaseous phase 75 and a flow of a liquid phase 73. The partial condensation and phase separation functions of the chiller or heat exchanger (and/or optional JT valve) may be combined in a single device. The flow of liquid phase 73 constitutes the NGL liquid. The flow of gaseous phase 75 may be used in on-site power generation equipment and/or in internal combustion engines.

Figure 4:
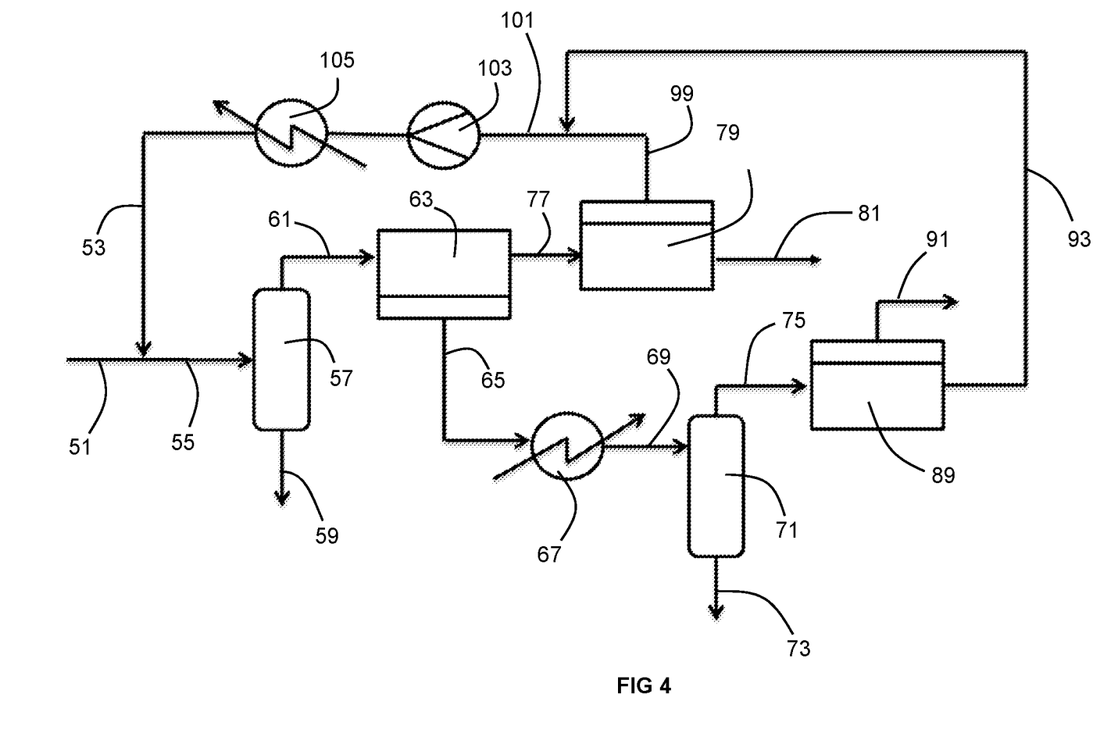
FIG. 4 is a schematic of an embodiment of the method and system of the invention.

The scheme shown in FIG. 4 is the same as the scheme illustrated in FIG. 3, except that instead of recovering a flow of the gaseous phase 75 as a low BTU value fuel in on-site power generation equipment or internal combustion engines, the gaseous phase 75 is fed to a third stage 89. The third stage 89 is optimized to produce a flow of a third permeate 91 with a high $C_{3+}$ hydrocarbon content which may be used in onsite power generation equipment and/or in internal combustion engines. In order to boost recovery of methane by the process, the third stage 89 is also optimized to produce a flow of a third retentate 93 which is combined with the flow of second permeate 99. The combined flow 101 is compressed at compressor 103 and cooled at chiller or heat exchanger 105 before the cooled compressed combined flow 53 is combined with the flow of associated gas 51.

EXAMPLES

Examples 1-2 described below are the results of computer simulations.

Example 1

Figure 5:
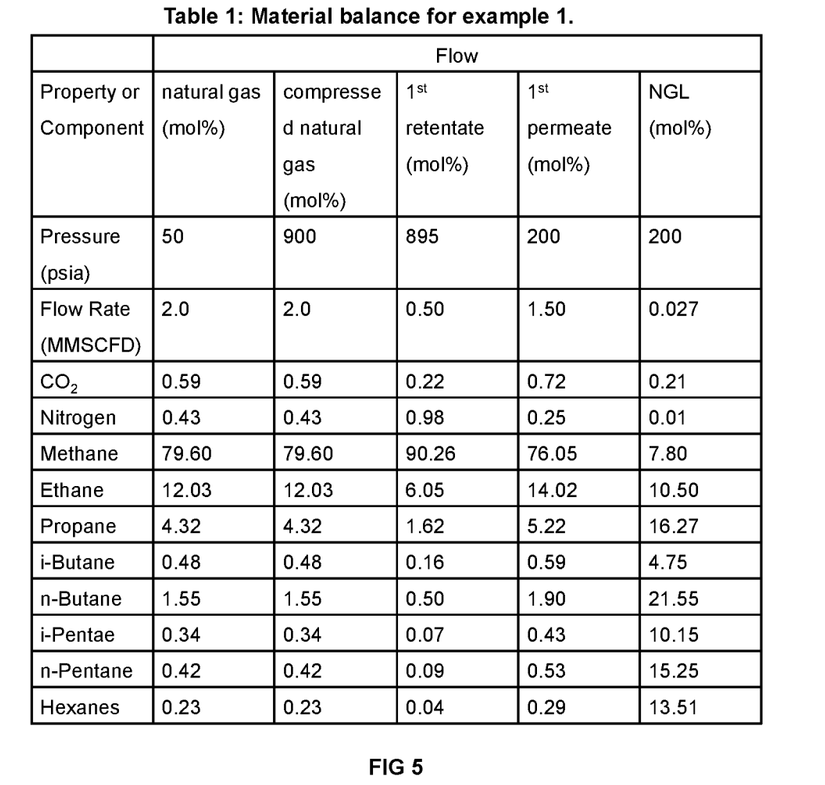
FIG. 5 is a table listing mass balance values for Example 1.

This example is carried out not according to the present invention. Instead of further purification of the retentate from the first separation stage at a downstream gas separation membrane-based separation stage, the retentate from the first separation stage is recovered as the product gas. Treatment of a feed flow (at a flow rate of 2.0 MMSCFD and a feed pressure of 50 psia) of natural gas, having the composition listed in Table 1 displayed in FIG. 5, was treated in a single stage membrane process (utilizing a PEEK-Sep membrane commercially available from Air Liquide Advanced Separation). The gas is first compressed up to 900 psia and then fed into PEEK-Sep hollow fiber membrane. The permeate gas is collected at the pressure of 200 psia and then chilled to −10° C. to collect NGL. The clean gas is collected at 895 psia with methane concentration higher than 90%. The total clean gas collected is 0.5 MMSCFD and NGL collected is 20.6 Barrer/Day.

Example 2

Figure 6:
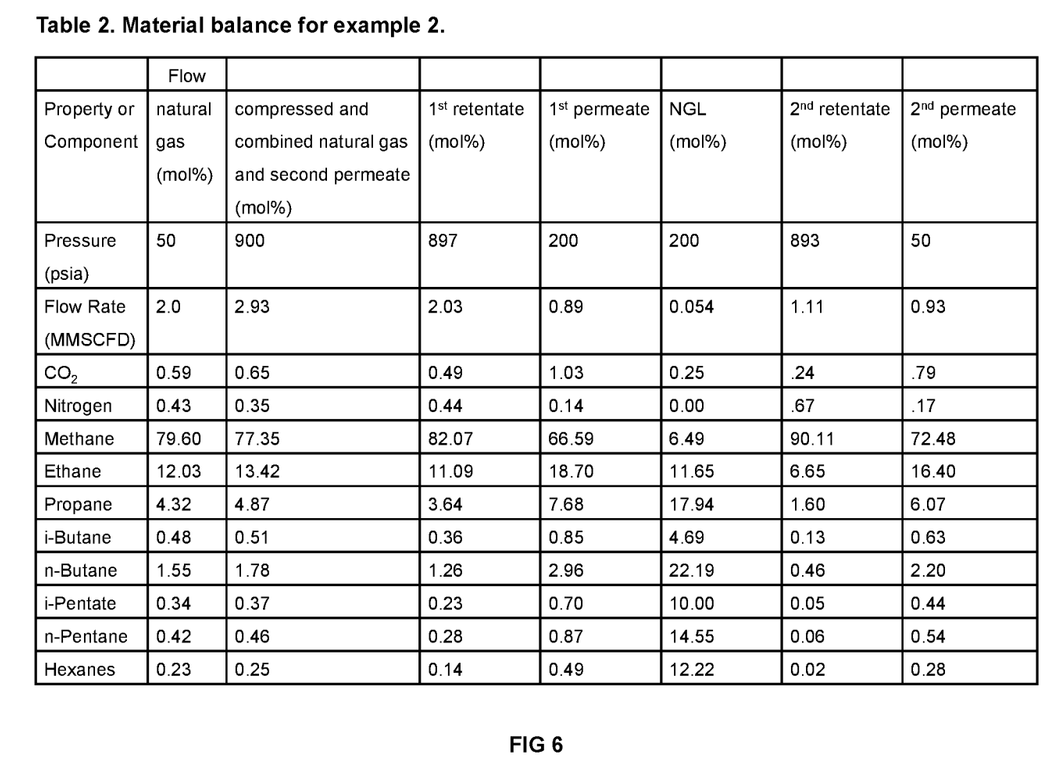
FIG. 6 is a table listing mass balance values for Example 1.

This example is carried out according to the invention. The flow of natural gas has the same gas composition, pressure, temperature as the one in the Example 1. The natural gas is treated with a two stage membrane process (also using a PEEK-Sep hollow fiber membrane commercially available from Air Liquide Advanced Separation). The gas is first compressed up to 900 psia and then fed into the first stage PEEK-Sep hollow fiber membrane. The permeate gas is collected at the pressure of 200 psia and then chilled to −10° C. to collect NGL. The retentate of the first stage is then fed into the second stage membrane. The clean gas is collected at 893 psia with methane concentration higher than 90% from the retentate of the second stage membrane. The permeate of the second stage membrane is recycled back to the header of the compressor. The total clean gas collected is 1.1 MMSCFD and NGL collected is 38.9 Barrer/Day. The material balance is shown in Table 2 that is displayed in FIG. 6.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for dewpointing natural gas that provides for recovery of NGL, comprising the steps of:
feeding a flow of associated gas, that does not meet a predetermined specification(s) for hydrocarbon dewpoint and/or a gross heating value, to a first gas separation membrane-based separation stage comprising one or more gas separation membranes selective for $C_{2+}$ hydrocarbons over methane to produce a flow of a first permeate enriched in $C_{2+}$ hydrocarbons and a flow of a first retentate enriched in methane;
chilling the first permeate to provide a flow of chilled first permeate;
separating the flow of chilled first permeate to produce a flow of a first gaseous phase deficient in $C_{3+}$ hydrocarbons and a flow of a first liquid phase enriched in $C_{3+}$ hydrocarbons;
recovering the flow of the first liquid phase as NGL;
feeding the flow of a first retentate, that does not meet a predetermined specification for gross heating value, to a second gas separation membrane-based separation comprising one or more gas separation membranes selective for $C_{2+}$ hydrocarbons over methane to produce a flow of a second permeate enriched in $C_{2+}$ hydrocarbons and a flow of a second retentate enriched in methane that meets the predetermined specification;
recovering the flow of a second retentate, the recovered second retentate meeting a predetermined specification(s);
compressing the flow of second permeate; and
feeding the flow of compressed second permeate along with the flow of associated gas to the first gas separation membrane-based separation stage,
wherein the flow of second permeate and the flow of natural gas are combined and compressed prior to being fed to the first gas separation membrane-based separation stage, prior to being combined with the flow of second permeate and compressed, the flow of natural gas has a pressure of 1-15 bar,
and wherein the process further comprises the steps of:
feeding the flow of first gaseous phase to a third gas separation membrane-based separation unit comprising one or more gas separation membranes selective for $CO_2$ over methane to produce a flow of a third permeate enriched in $CO_2$ and a third retentate enriched in methane; and
feeding the flow of compressed third retentate along with the flow of second permeate and the flow of natural gas to the first gas separation membrane-based separation stage.

2. The process of claim 1, wherein each of the membranes of the first, second, and third gas separation membrane-based separation stages has a selective layer made of a same polymer, the polymer being a rubbery polymer or being a glassy polymer having a high free volume.

3. The process of claim 1, further comprising the steps of: recovering the flow of the third permeate and using the recovered flow of the third permeate as a low-BTU fuel for powering on-site power generation equipment and/or in internal combustion engines.

4. The process of claim 1, further comprising the steps of recovering the flow of the first gaseous phase and using the recovered flow of the first gaseous phase as a low-BTU fuel for powering on-site power generation equipment and/or in internal combustion engines.

5. A process for dewpointing natural gas that provides for recovery of NGL, comprising the steps of:
feeding a flow of associated gas, that does not meet a predetermined specification(s) for hydrocarbon dewpoint and/or a gross heating value, to a first gas separation membrane-based separation stage comprising one or more gas separation membranes selective for $C_{2+}$ hydrocarbons over methane to produce a flow of a first permeate enriched in $C_{2+}$ hydrocarbons and a flow of a first retentate enriched in methane;
chilling the first permeate to provide a flow of chilled first permeate;
separating the flow of chilled first permeate to produce a flow of a first gaseous phase deficient in $C_{3+}$ hydrocarbons and a flow of a first liquid phase enriched in $C_{3+}$ hydrocarbons;
recovering the flow of the first liquid phase as NGL;
feeding the flow of a first retentate, that does not meet a predetermined specification for gross heating value, to a second gas separation membrane-based separation comprising one or more gas separation membranes selective for $C_{2+}$ hydrocarbons over methane to produce a flow of a second permeate enriched in $C_{2+}$ hydrocarbons and a flow of a second retentate enriched in methane that meets the predetermined specification;
recovering the flow of a second retentate, the recovered second retentate meeting a predetermined specification(s);
compressing the flow of second permeate; and
feeding the flow of compressed second permeate along with the flow of associated gas to the first gas separation membrane-based separation stage,
wherein the flow of natural gas has not been compressed prior to being fed to the first gas separation membrane-based separation stage, the flow of natural gas having a pressure of 15-100 bar, and wherein the process further comprises the step of feeding the flow of first gaseous phase to a third gas separation membrane-based separation unit comprising one or more gas separation membranes selective for $CO_2$ over methane to produce a flow of a third permeate enriched in $CO_2$ and a flow of a third retentate enriched in methane, wherein the flow of second permeate and the flow of third retentate are combined and compressed prior to being fed to the first gas separation membrane-based separation stage.

6. The process of claim 5, wherein each of the membranes of the first, second, and third gas separation membrane-based separation stages has a selective layer made of a same polymer, the polymer being a rubbery polymer or being a glassy polymer having a high free volume.

7. The process of claim 5, further comprising the steps of further comprising the steps of: recovering the flow of the third permeate and using the recovered flow of the third permeate as a low-BTU fuel for powering on-site equipment.

8. The process of claim 5, further comprising the steps of recovering the flow of the first gaseous phase and using the recovered flow of the first gaseous phase as a low-BTU fuel for powering on-site power generation equipment and/or in internal combustion engines.

9. The process of claim 1, wherein the one or more membranes of the first and second gas separation membrane-based separation units have a selective layer comprising a rubbery polymer.

10. The process of claim 1, wherein the one or more membranes of the first and second gas separation membrane-based separation units have a selective layer comprising a glassy polymer having a high free volume.

11. The process of claim 1, wherein each of the membranes of the first and second gas separation membrane-based separation units have a selective layer made of a same polymer, the polymer being a rubbery polymer or being a glassy polymer having a high free volume.

* * * * *